United States Patent
Blum et al.

(10) Patent No.: US 10,909,333 B2
(45) Date of Patent: Feb. 2, 2021

(54) MACHINE INTERPRETATION OF DISTRESS SITUATIONS USING BODY LANGUAGE

(71) Applicant: Carrier Corporation, Palm Beach Gardens, FL (US)

(72) Inventors: Kimberly Blum, Fairport, NY (US); Ben Holm, Farmington, NY (US); Jonathan Rupe, Rochester, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 101 days.

(21) Appl. No.: 16/181,548

(22) Filed: Nov. 6, 2018

(65) Prior Publication Data

US 2019/0138604 A1    May 9, 2019

Related U.S. Application Data

(60) Provisional application No. 62/582,569, filed on Nov. 7, 2017.

(51) Int. Cl.
*G10L 25/00* (2013.01)
*G10L 21/06* (2013.01)
(Continued)

(52) U.S. Cl.
CPC .............. *G06F 40/58* (2020.01); *G06F 3/017* (2013.01); *G06K 9/00355* (2013.01);
(Continued)

(58) Field of Classification Search
CPC ..... G06F 3/017; G09B 21/009; G09B 21/001; G08B 13/19613; G08B 6/00
See application file for complete search history.

(56) References Cited

U.S. PATENT DOCUMENTS 7,036,094 B1   4/2006  Cohen et al.
8,253,527 B2   8/2012  Yang et al.
(Continued)

FOREIGN PATENT DOCUMENTS

CN    106056840 A    10/2016
JP    2007251756 A   9/2007
WO    2017048115 A1   3/2017

OTHER PUBLICATIONS

European Search Report for application EP 18204854.6, dated Jan. 30, 2019, 8 pages.
(Continued)

*Primary Examiner* — Olujimi A Adesanya
(74) *Attorney, Agent, or Firm* — Cantor Colburn LLP (57) ABSTRACT

A system for remote body communication that includes a processor configured to receive a video feed of a person performing a body communication. The processor is configured to determine whether the body communication is indicative of an emergency situation, translate the body communication, to a text or audio communication, and transmit the video feed and the text or audio communication to a receiving monitoring station. The processor then receives a responsive video feed of a responsive body communication and a responsive text or audio communication indicative of an instruction related to the emergency situation, and outputs the responsive video feed of the responsive body communication and the responsive text or audio communication via an operatively connected output processor.

20 Claims, 5 Drawing Sheets

(51) Int. Cl.
  *G06F 17/28* (2006.01)
  *G06F 40/58* (2020.01)
  *G06K 9/00* (2006.01)
  *H04N 7/14* (2006.01)
  *G09B 21/00* (2006.01)
  *G06F 3/01* (2006.01)
  *G06N 7/00* (2006.01)
  *G08B 13/196* (2006.01)

(52) U.S. Cl.
  CPC ............ G06N 7/005 (2013.01); G09B 21/009 (2013.01); H04N 7/147 (2013.01); *G08B 13/19613* (2013.01)

(56) References Cited

U.S. PATENT DOCUMENTS

| | | |
|---|---|---|
| 8,751,215 B2 | 6/2014 | Tardif |
| 9,329,597 B2 | 5/2016 | Stoschek et al. |
| 9,336,456 B2 | 5/2016 | Delean |
| 9,338,627 B1 | 5/2016 | Singh et al. |
| 9,349,366 B2 | 5/2016 | Giancarlo |
| 9,432,639 B2 | 8/2016 | Oh et al. |
| 9,544,656 B1 | 1/2017 | Nichols |
| 2005/0033578 A1 | 2/2005 | Zuckerman |
| 2008/0043935 A1* | 2/2008 | Liebermann ....... G06Q 20/1085 379/52 |
| 2012/0224040 A1 | 9/2012 | Wang |
| 2014/0266572 A1 | 9/2014 | Taggart et al. |
| 2014/0313014 A1* | 10/2014 | Huh ..................... G08B 7/066 340/7.55 |
| 2015/0194034 A1* | 7/2015 | Shim .................. G08B 21/0476 348/77 |
| 2015/0312739 A1* | 10/2015 | Burt ........................ A61B 7/00 455/404.1 |
| 2016/0078289 A1 | 3/2016 | Michel et al. |
| 2016/0094965 A1* | 3/2016 | Sennett ................. H04W 4/90 455/404.1 |
| 2016/0364606 A1* | 12/2016 | Conway ............. G06K 9/00302 |
| 2017/0005958 A1* | 1/2017 | Frenkel ................. H04W 4/90 |
| 2017/0351910 A1* | 12/2017 | Elwazer ............... H04N 13/204 |

OTHER PUBLICATIONS

Irina Mocanu et al, "A Model for Activity Recognition and Emergency Detection in Smart Environments", Computer Science Department University "Politehnica" of Bucharest, Bucharest, Romania, pp. 13-19.

M. Murugeswari et al, "Hand Gesture Recognition Sysem for Real-Time Application", abstract, IEEE Conference Publication, 3 pages.

* cited by examiner

MACHINE INTERPRETATION OF DISTRESS SITUATIONS USING BODY LANGUAGE

CROSS-REFERENCE TO RELATED APPLICATIONS

This application claims the benefit of U.S. provisional patent application Ser. No. 62/582,569, filed Nov. 7, 2017, the entire contents of which are incorporated herein by reference.

BACKGROUND

Exemplary embodiments pertain to the art of body language interpretation and more specifically to machine interpretation of distress situations using body language.

When language or hearing impaired individuals use remote emergency stations like those commonly used in some parking garages, it may be difficult to provide or receive information from the person in distress due to language impairment. For example, if an individual communicates using sign language, a voice communication system alone would not be effective. In some situations the person in distress may only signal for help, but may not be able to provide details of the emergency or receive instructions or feedback from the emergency monitor. In other aspects, when groups of people are in distress, monitoring stations are not able to detect emergency situations based on crowd movement or group body language.

BRIEF DESCRIPTION

Disclosed is a computer implemented method that includes receiving, via a processor, a video feed of a person performing a body communication. The processor determines whether the body communication is indicative of an emergency situation, translates the body communication to a text or audio communication, and transmits the video feed and the text or audio communication to a receiving monitoring station. The processor receives a responsive video feed of a responsive body communication and a responsive text or audio communication indicative of an instruction related to the emergency situation, and outputs the responsive video feed of the responsive body communication and the responsive text or audio communication via an operatively connected output processor.

Also disclosed is a system for remote body communication. The system includes a processor configured to receive a video feed of a person performing a body communication. The processor is configured to determine whether the body communication is indicative of an emergency situation, translate the body communication to a text or audio communication, and transmit the video feed and the text or audio communication to a receiving monitoring station. The processor then receives a responsive video feed of a responsive body communication and a responsive text or audio communication indicative of an instruction related to the emergency situation, and outputs the responsive video feed of the responsive body communication and the responsive text or audio communication via an operatively connected output processor.

A non-transitory computer-readable storage medium is also disclosed. The storage medium includes a computer program product that, when executed by a processor, causes the processor to perform a computer-implemented method. The method includes receiving, via a processor, a video feed of a person performing a body communication. The processor determines whether the body communication is indicative of an emergency situation, translates the body communication to a text or audio communication, and transmits the video feed and the text or audio communication to a receiving monitoring station. The processor receives a responsive video feed of a responsive body communication and a responsive text or audio communication indicative of an instruction related to the emergency situation, and outputs the responsive video feed of the responsive body communication and the responsive text or audio communication via an operatively connected output processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
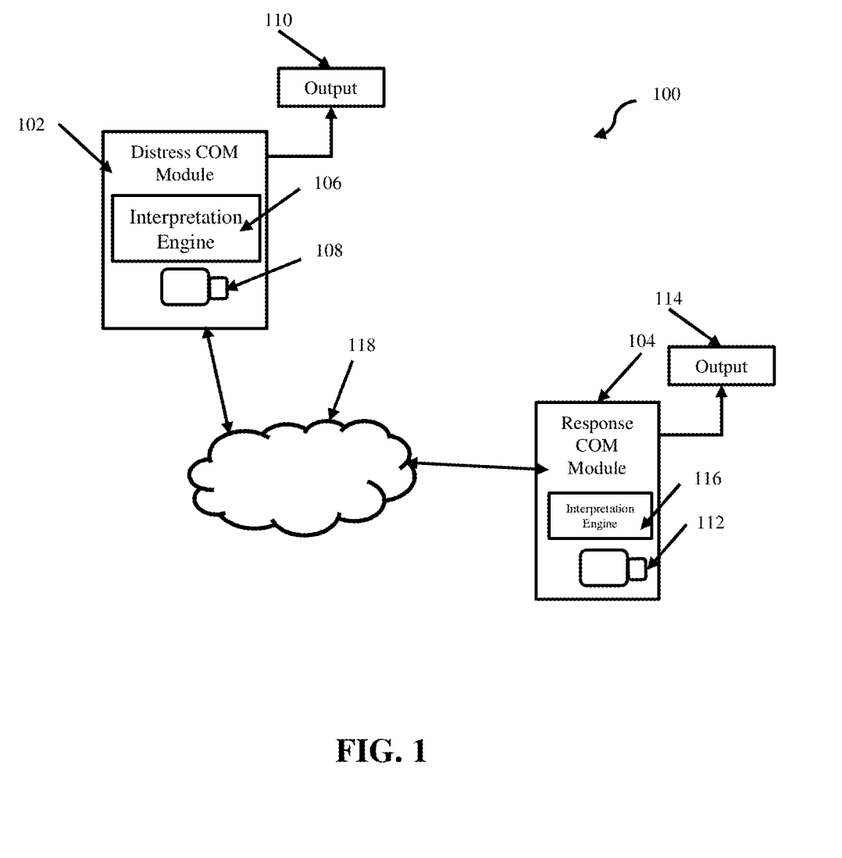
FIG. 1 depicts a system 100 for machine interpretation of distress situations using body language according to one or more embodiments herein.

FIG. 1 is a system 100 for practicing one or more embodiments. System 100 includes, for example, a monitoring and communication module (hereinafter distress COM module 102) and a response communication module (hereinafter response COM module 104).

Distress COM module 102 may be installed in a location occupied by users that may be, from time to time, in a distress or emergency situation. For example, the distress COM module 102 may be installed in a parking garage. The distress COM module 102 includes a processor running an interpretation engine 106, a video camera 108 for receiving and transmitting a video feed, and an output processor 110 operatively connected to the processor and configured to output a responsive video feed received from the response COM module 104. The distress COM module 102 is operatively connected to the response COM module 104 via a network 118.

Response COM module 104 may be installed in a response center remotely located from distress COM module 102. For example, response COM module 104 is operable to monitor one or more distress COM modules such as, for example, distress COM module 102. Response COM module 104 includes a processor running an interpretation engine 116. Interpretation engine 116 is configured to receive a video feed from an operatively connected camera 112, and transmit the video feed to distress COM module 102, which then outputs the video feed of the monitoring individual (e.g., a security guard) to be seen by the person in distress at distress COM module 102. The video feed transmitted to the distress COM module 102 may include a responsive communication to a distress signal, and/or may include instructions for the individual in distress. The responsive communication may be in sign language, verbal communication, written textual communication, or any combination thereof.

Figure 2:
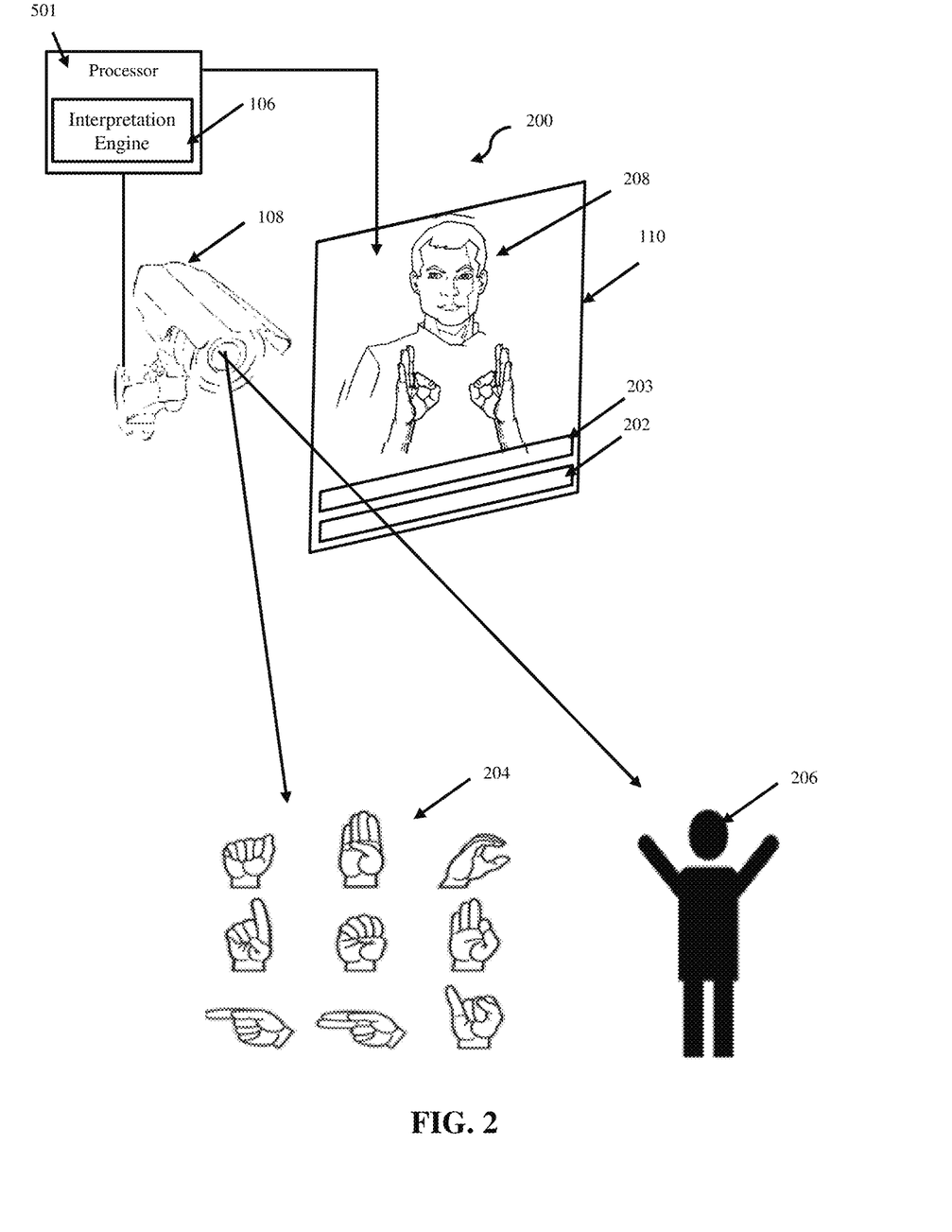
FIG. 2 depicts a distress communication module 102 for machine interpretation of distress situations using body language according to one embodiment.
Figure 5:
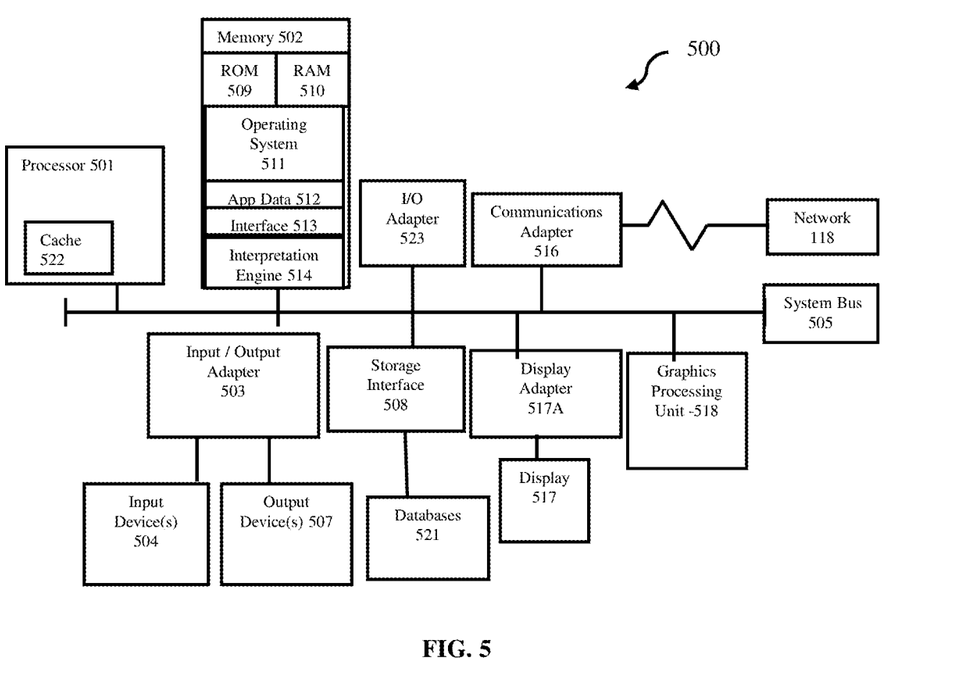
FIG. 5 depicts a computing system for practicing one or more embodiments described herein.

FIG. 2 depicts a distress communication module 102 according to one embodiment. As shown in FIG. 2, the system includes a processor 501 configured with the interpretation engine 106, which are operatively connected to the camera 108. In one embodiment, the camera 108 is configured to receive a video feed of a person performing a body communication. For example, a person 206 that is speech impaired may be in a distress situation. The person 206 may be signaling for help (represented in FIG. 2 as sign language 204). In another aspect, the person 206 may be performing a body communication indicative that he is in distress, or that there is some emergency that requires assistance. The camera 108 may receive a video feed of the person 206, and the interpretation engine 106 determines whether the body communication is indicative of an emergency situation. The interpretation engine 106, responsive to determining that there is an emergency situation, translates the body communication 204 to a text communication 202, which is output on an output processor 110 (for example, a display device 517) operatively connected to the display processor (e.g., display adapter 517A, as shown in FIG. 5) of the distress COM module 102. In one aspect, when the body communication 204 is sign language, the processor 501 simultaneously displays a translation of the body communication 204 (the sign language) from the person 206 on the display device 110. The text communication 202 provides immediate feedback to the speech impaired person 206 that their distress communication is received and understood. At the same time, the processor 501 outputs the responsive video feed of the monitor at the other end of the video conference. The video feed 208 of the responsive body communication (for example, the monitoring security guard at the response COM module 104) is signing a response to give instructions or reassurance to the person in distress 206 that help is on the way.

Figure 3:
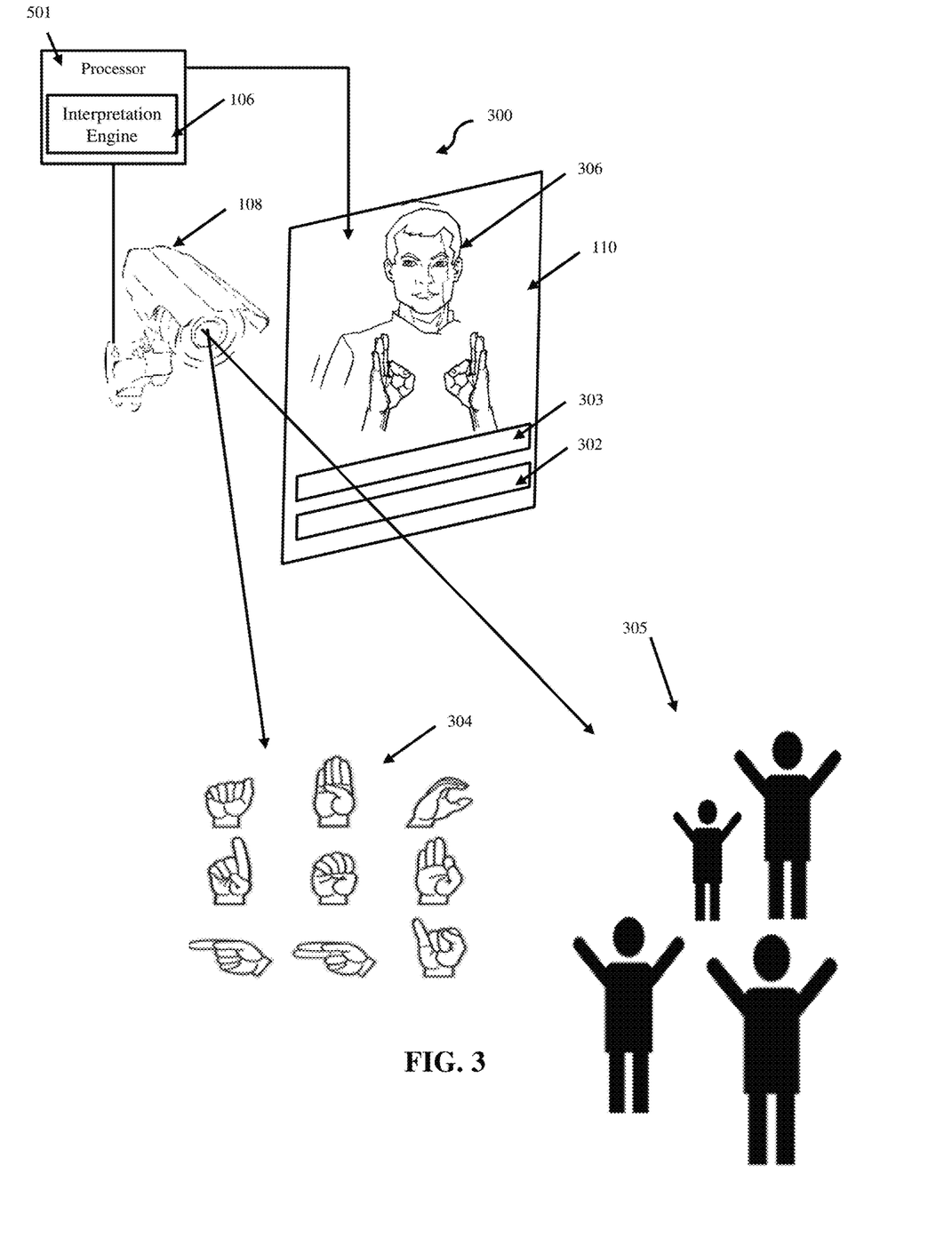
FIG. 3 depicts a distress communication module 102 according to another embodiment.

FIG. 3 depicts another embodiment 300 of a system for machine interpretation of distress situations using body language. In some aspects, the body language may not necessarily be sign language 304, but instead may be body language exhibited by a group of people 305. For example, a group of people crowding to one area so as to observe a medical emergency may trigger the interpretation engine 106 to determine that there is an emergency in progress that may require outside assistance (e.g., an ambulance). The interpretation engine 106 may transmit a message to the response COM module 104 that flags the attention of a security guard on duty. In one aspect, the monitoring guard (or more particularly, a video feed 306 of the guard) may ask a bystander via the video conference, for more information about what is happening in response to the transmitted message. In another aspect, the person providing the information to the guard may be speech impaired and using sign language 304 as body communication. In this embodiment, the interpretation engine 106 translates the communication, which is then output on output processor 110 simultaneous to their giving the communication. The simultaneous output provides the speaker (e.g., one of the group of people 305) positive confirmation that their communication is understood. Responsive communication is output on the output processor 110 as both a video feed and as textual communication 302. The video feed may include audio of the spoken voice of the communicator.

Figure 4:
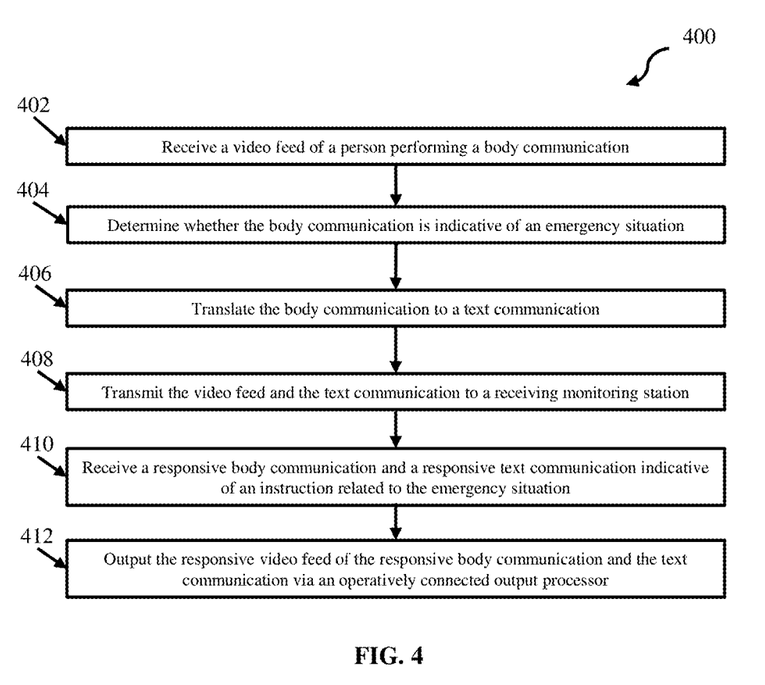
FIG. 4 is a flow chart of a method for machine interpretation of distress situations using body language according to another embodiment.

FIG. 4 is a flow chart of a method 400 for machine interpretation of distress situations using body language, according to another embodiment. As shown in FIG. 4, at block 402 the processor 501 receives a video feed of a person performing a body communication.

At block 404, the processor determines whether the body communication is indicative of an emergency situation. In some aspects, the processor 501 makes the determination by observing one or more factors indicative of an emergency situation, compares a number of occurrences of that factor to a database of known reactions to a distress signal, and outputs a probability determination score indicative of whether or not a certain situation is actually an emergency. In one aspect, the processor 501 may determine that an emergency exists when the probability determination score is above or below a predetermined threshold.

At block 406, the processor 501 translates the body communication to a text communication. In one aspect, translating the body communication includes parsing a plurality of images of the video feed, identifying at least one hand in motion, and correlating the hand motion to one or more words associated with the hand motion. Those skilled in the art appreciate that there are known methods for translating sign language to textual information.

In other aspects, the body communication may not be sign language, but rather may be body language exhibited by one or more persons in the video feed. For example, translating the body communication can include parsing a plurality of images of the video feed, and identifying, from the parsed video feed, at least one non-sign language body motion indicative of distress. One such example may be a group of people running away in the same direction. In another example, facial expressions of multiple people in the video feed may exhibit terror or fear, which may be indicative of an emergency situation. Accordingly, the processor 501 may determine a probability score that the non-sign language body motion is indicative of distress, and correlate the non-sign language body motion with a verbal meaning based on the probability score.

At block 408, the processor 501 transmits the video feed and the text communication to a receiving monitoring station. A receiving monitoring station may include, for example, the response COM module 104.

At block 410, the processor 501 receives a responsive body communication and a responsive text communication indicative of an instruction related to the emergency situation. An example of an instruction may be, "wait there for help, or "exit quickly to your left." In another aspect the responsive body communication also includes an audio output of the communication that serves as an alert to a possible attacker that help is on the way. Such a warning may be deterrent to further action on the part of the attacker.

At block 412 the processor 501 outputs the responsive video feed (e.g., 110, 306) of the responsive body communication and the text communication (e.g., 203, 303) via an operatively connected output processor (e.g., video display 110).

FIG. 5 illustrates a block diagram of an exemplary computing environment and computer system 500 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 500 therefore can embody a general-purpose computer. In another exemplary embodiment, the implementation can be part of a mobile device, such as, for example, a mobile phone, a personal data assistant (PDA), a tablet computer, etc.

As shown in FIG. 5, the computer 500 includes processor 501. Computer 500 also includes memory 502 communicatively coupled to processor 501, and one or more input/output adapters 503 that can be communicatively coupled via system bus 505. Memory 502 can be communicatively coupled to one or more internal or external memory devices via a storage interface 508. Communications adapter 516 can communicatively connect computer 500 to one or more networks 118. System bus 505 can communicatively connect one or more user interfaces via input/output (I/O) adapter 503. I/O adapter 503 can connect a plurality of input devices 504 to computer 500. Input devices can include, for example, a keyboard, a mouse, a microphone, a sensor, etc. System bus 505 can also communicatively connect one or more output devices 507 via I/O adapter 503. Output device 507 can include, for example, a display, a speaker, a touchscreen, etc.

Processor 501 is a hardware device for executing program instructions (aka software), stored in a computer-readable memory (e.g., memory 502). Processor 501 can be any custom made or commercially available processor, a central processing unit (CPU), a plurality of CPUs, an auxiliary processor among several other processors associated with the computer 500, a semiconductor based microprocessor (in the form of a microchip or chip set), or generally any device for executing instructions. Processor 501 can include a cache memory 522, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 can be organized as a hierarchy of more cache levels (L1, L2, etc.).

Processor 501 can be disposed in communication with one or more memory devices (e.g., RAM 509, ROM 510, one or more external databases 521, etc.) via a storage interface 508. Storage interface 508 can also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 502 can incorporate electronic, magnetic, optical, and/or other types of non-transitory computer-readable storage media. Memory 502 can also be a distributed architecture, where various components are situated remote from one another, but can be accessed by processor 501.

The instructions in memory 502 can include one or more separate programs, each of which can include an ordered listing of computer-executable instructions for implementing logical functions. In the example of FIG. 5, the instructions in memory 502 can include an operating system 511. Operating system 511 can control the execution of other computer programs and provides scheduling, input-output control, file and data management, memory management, and communication control and related services.

The program instructions stored in memory 502 can further include application data 512, and for a user interface 513. The program instructions in memory 502 can further include an interpretation engine 514 for interpreting sign language and/or body language and converting the interpretations into textual information.

I/O adapter 503 can be, for example but not limited to, one or more buses or other wired or wireless connections. I/O adapter 503 can have additional elements (which are omitted for simplicity) such as controllers, microprocessors, buffers (caches), drivers, repeaters, and receivers, which can work in concert to enable communications. Further, I/O adapter 503 can facilitate address, control, and/or data connections to enable appropriate communications among the aforementioned components.

I/O adapter 503 can further include a display adapter 517A coupled to one or more displays 517. I/O adapter 503 can be configured to operatively connect one or more input/output (I/O) devices 504 and 507 to computer 500. For example, I/O 503 can connect a keyboard and mouse, a touchscreen, a speaker, a haptic output device, or other output device. Output devices 507 can include but are not limited to a printer, a scanner, and/or the like. Other output devices can also be included, although not shown. Finally, the I/O devices connectable to I/O adapter 503 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 500 can include a mobile communications adapter 523. Mobile communications adapter 523 can include GPS, cellular, mobile, and/or other communications protocols for wireless communication.

In some embodiments, computer 500 can further include communications adapter 516 for coupling to a network 118.

Network 118 can be an IP-based network for communication between computer 500 and any external device. Network 118 transmits and receives data between computer 500 and devices and/or systems external to computer 500. In an exemplary embodiment, network 118 can be a managed IP network administered by a service provider. Network 118 can be a network internal to an aircraft, such as, for example, an avionics network, etc. Network 118 can be implemented in a wireless fashion, e.g., using wireless protocols and technologies, such as WiFi, WiMax, etc. Network 118 can also be a wired network, e.g., an Ethernet network, an ARINC 429 network, a controller area network (CAN), etc., having any wired connectivity including, e.g., an RS232 connection, R5422 connection, etc. Network 118 can also be a packet-switched network such as a local area network, wide area network, metropolitan area network, Internet network, or other similar type of network environment. The network 118 can be a fixed wireless network, a wireless local area network (LAN), a wireless wide area network (WAN) a personal area network (PAN), a virtual private network (VPN), intranet or other suitable network system.

If computer 500 is a PC, workstation, laptop, tablet computer and/or the like, the instructions in the memory 502 can further include a basic input output system (BIOS) (omitted for simplicity). The BIOS is a set of routines that initialize and test hardware at startup, start operating system 511, and support the transfer of data among the operatively connected hardware devices. The BIOS is typically stored in ROM 510 so that the BIOS can be executed when computer 500 is activated. When computer 500 is in operation, processor 501 can be configured to execute instructions stored within the memory 502, to communicate data to and from the memory 502, and to generally control operations of the computer 500 pursuant to the instructions.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method comprising:
   receiving, via a processor, a video feed of a person performing a body communication;
   determining, via the processor, whether the body communication is indicative of an emergency situation;
   translating, via the processor, the body communication, to a text or audio communication;
   transmitting, via the processor, the video feed and the text or audio communication to a receiving monitoring station;
   receiving, via the processor, a responsive video feed of a responsive body communication and a responsive text or audio communication indicative of an instruction related to the emergency situation, the responsive video feed of the responsive body communication and the responsive text or audio communication generated in response to the video feed and the text or audio communication; and
   outputting, via the processor, the responsive video feed of the responsive body communication and the responsive text or audio communication via an operatively connected output processor.

2. The computer-implemented method of claim 1, wherein the body communication and the responsive body communication are sign language.

3. The computer-implemented method of claim 1, wherein the body communication comprises a non-sign language signal of distress.

4. The computer-implemented method of claim 2, wherein translating the body communication comprises:
   parsing a plurality of images of the video feed;
   identifying at least one hand in motion; and
   correlating, via the processor executing a translation engine, the hand motion to one or more words associated with the hand motion.

5. The computer-implemented method of claim 3, wherein translating the body communication comprises:
   parsing a plurality of images of the video feed;
   identifying, from the parsed video feed, at least one non-sign language body motion indicative of distress; and
   determining, via the processor, a probability score that the non-sign language body motion is indicative of distress; and
   correlating, via the processor, the non-sign language body motion with a verbal meaning based on the probability score.

6. The computer-implemented method of claim 5, wherein the non-sign language body motion comprises a plurality of body motions of a plurality of individuals in the parsed video feed.

7. The computer-implemented method of claim 1, further comprising outputting, via the operatively connected video processor, the responsive text or audio communication indicative of the instruction related to the emergency situation.

8. The computer-implemented method of claim 7, wherein the responsive body communication is sign language, and the responsive text communication is a textual translation of the responsive body communication, and the responsive audio communication is an audible translation of the responsive body communication.

9. The computer-implemented method of claim 8, wherein the responsive text or audio communication is output to the video processor at the same time as the responsive body communication.

10. A system for remote body communication comprising:
    a processor configured to:
    receive a video feed of a person performing a body communication;
    determine whether the body communication is indicative of an emergency situation;
    translate the body communication, to a text or audio communication;
    transmit the video feed and the text or audio communication to a receiving monitoring station;
    receive a responsive video feed of a responsive body communication and a responsive text or audio communication indicative of an instruction related to the emergency situation, the responsive video feed of the responsive body communication and the responsive text or audio communication generated in response to the video feed and the text or audio communication; and
    output the responsive video feed of the responsive body communication and the responsive text or audio communication via an operatively connected output processor.

11. The system of claim 10, wherein the body communication and the responsive body communication are sign language.

12. The system of claim 10, wherein the body communication comprises a non-sign language signal of distress.

13. The system of claim 11, wherein translating the body communication comprises:
    parsing a plurality of images of the video feed;
    identifying at least one hand in motion; and
    correlating, via the processor executing a translation engine, the hand motion to one or more words associated with the hand motion.

14. The system of claim 12, wherein translating the body communication comprises:
    parsing a plurality of images of the video feed;
    identifying, from the parsed video feed, at least one non-sign language body motion indicative of distress; and
    determining, via the processor, a probability score that the non-sign language body motion is indicative of distress; and correlating, via the processor, the non-sign language body motion with a verbal meaning based on the probability score.

15. The system of claim 14, wherein the non-sign language body motion comprises a plurality of body motions of a plurality of individuals in the parsed video feed.

16. The system of claim 10, further comprising outputting, via the operatively connected video processor, the responsive text or audio communication indicative of the instruction related to the emergency situation.

17. The system of claim 16, wherein the responsive body communication is sign language, and the responsive text communication is a textual translation of the responsive body communication, and the responsive audio communication is an audible translation of the responsive body communication.

18. The system of claim 17, wherein the responsive text communication is output to the video processor at the same time as the responsive body communication.

19. A non-transitory computer-readable storage medium comprising a computer program product that, when executed by a processor, causes the processor to perform a computer-implemented method comprising:

receiving, via a processor, a video feed of a person performing a body communication;

determining, via the processor, whether the body communication is indicative of an emergency situation;

translating, via the processor, the body communication, to a text or audio communication;

transmitting, via the processor, the video feed and the text or audio communication to a receiving monitoring station;

receiving, via the processor, a responsive video feed of a responsive body communication and a responsive text or audio communication indicative of an instruction related to the emergency situation, the responsive video feed of the responsive body communication and the responsive text or audio communication generated in response to the video feed and the text or audio communication; and outputting, via the processor, the responsive video feed of the responsive body communication and the responsive text or audio communication via an operatively connected output processor.

20. The non-transitory computer-readable storage medium of claim 19, wherein the body communication and the responsive body communication are sign language.

* * * * *